United States Patent
Dudar (10) Patent No.: US 10,233,857 B2
(45) Date of Patent: Mar. 19, 2019

(54) SYSTEMS AND METHODS FOR DISCERNING FUEL TANK PRESSURE TRANSDUCER DEGRADATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 561 days.

(21) Appl. No.: 14/819,181

(22) Filed: Aug. 5, 2015

(65) Prior Publication Data

US 2017/0037806 A1  Feb. 9, 2017

(51) Int. Cl.
| | | |
|---|---|---|
| *F02D 41/22* | (2006.01) | |
| *F02M 25/08* | (2006.01) | |
| *F02D 41/00* | (2006.01) | |
| *F02D 41/04* | (2006.01) | |

(52) U.S. Cl.
CPC ....... *F02D 41/222* (2013.01); *F02M 25/0809* (2013.01); *F02M 25/0836* (2013.01); *F02D 41/003* (2013.01); *F02D 41/0042* (2013.01); *F02D 41/042* (2013.01); *Y02T 10/40* (2013.01)

(58) Field of Classification Search
CPC ............ F02M 25/0809; F02M 25/0836; F02D 41/003; F02D 41/222; F02D 2041/223
See application file for complete search history.

(56) References Cited

U.S. PATENT DOCUMENTS

| 5,265,577 | A | * | 11/1993 | Denz | F02M 25/0809 |
|---|---|---|---|---|---|
| | | | | | 123/198 D |
| 7,900,608 | B2 | | 3/2011 | Peters et al. | |
| 8,215,291 | B2 | | 7/2012 | De Bastos et al. | |
| 8,342,157 | B2 | | 1/2013 | Der Manuelian et al. | |
| 8,353,273 | B2 | | 1/2013 | McLain et al. | |
| 8,776,585 | B2 | | 7/2014 | Pursifull et al. | |
| 9,751,396 | B2 | * | 9/2017 | Dudar | F02D 41/003 |
| 2012/0152210 | A1 | | 6/2012 | Reddy et al. | |
| 2014/0130781 | A1 | * | 5/2014 | Jentz | F02M 25/0809 |
| | | | | | 123/520 |
| 2014/0257668 | A1 | * | 9/2014 | Jentz | F02M 25/0809 |
| | | | | | 701/102 |

(Continued)

OTHER PUBLICATIONS

Dudar, A. "System and Methods for Managing Refueling Vapors," U.S. Appl. No. 14/313,629, filed Jun. 24, 2014, 35 pages.

(Continued)

*Primary Examiner* — Stephen K Cronin
*Assistant Examiner* — Anthony L Bacon
(74) *Attorney, Agent, or Firm* — Julia Voutyras; McCoy Russell LLP (57) ABSTRACT

A method for a fuel system is provided, wherein a fuel vapor canister is vented to an engine intake during a first condition, and wherein a restriction in a canister vent pathway is indicated, responsive to a change in a fuel tank pressure transducer output greater than a threshold. If the fuel tank pressure transducer output changes less than the threshold, degradation of the fuel tank pressure transducer is indicated. In this way, a fuel tank pressure transducer offset may be distinguished from a canister vent pathway restriction if a fuel tank pressure transducer indicates a significant pressure or vacuum in a fuel tank following a vehicle-off soak.

19 Claims, 5 Drawing Sheets

(56) References Cited

U.S. PATENT DOCUMENTS

| | | |
|---|---|---|
| 2014/0345574 A1* | 11/2014 | Haefele .............. F02M 25/0809 |
| | | 123/519 |
| 2014/0374177 A1 | 12/2014 | Yang et al. |
| 2015/0075251 A1 | 3/2015 | Jentz et al. |
| 2015/0075267 A1 | 3/2015 | Sweppy et al. |
| 2015/0075501 A1 | 3/2015 | Peters et al. |
| 2015/0085894 A1 | 3/2015 | Yang et al. |
| 2015/0142293 A1* | 5/2015 | Dudar .................. G01M 15/05 |
| | | 701/101 |

OTHER PUBLICATIONS

Dudar, A. "Systems and Methods for Discerning Fuel Tank Pressure Transducer Degradation," U.S. Appl. No. 14/630,314, filed Feb. 24, 2015, 46 pages.

\* cited by examiner

SYSTEMS AND METHODS FOR DISCERNING FUEL TANK PRESSURE TRANSDUCER DEGRADATION

FIELD

The present description relates generally to methods and systems for controlling a vehicle evaporative emissions system to discern causes of system degradation.

BACKGROUND/SUMMARY

Leak detection routines may be intermittently performed on a fuel system and emissions control system to confirm that the systems are not degraded. Leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. If the systems are sealed from atmosphere, a pressure or vacuum will develop there within responsive to changes in ambient temperature if the systems are intact. Alternatively, leak detection routines may be performed while the engine is running by operating a vacuum pump and/or using engine intake manifold vacuum.

Such leak detection routines rely on a functional fuel tank pressure transducer (FTPT) to measure the pressure or vacuum within the fuel system. As such, the rationality of the FTPT must be periodically tested and confirmed. The FTPT may be tested for offset, to determine if a baseline output of the FTPT is accurate. One example approach for an FTPT offset test is shown by Jentz et al. in U.S. Patent Application 2015/0075251. Therein, the fuel tank is vented to atmosphere for a lengthy vehicle-off soak. If the FTPT is functional, a value within a threshold of atmospheric pressure should be output following the vehicle-off soak. A deviation from atmospheric pressure may result in a diagnostic trouble code (DTC) being set at the controller, and/or may result in the FTPT output being adjusted to compensate for any offset.

However, the inventors herein have recognized potential issues with such systems. As one example, an offset FTPT output following a vehicle-off soak may be due to factors other than FTPT degradation. For example, if the canister vent pathway is restricted or blocked, a pressure or vacuum may naturally develop in the fuel tank as ambient temperature changes. A mechanic may replace a functional FTPT due to a DTC, and may or may not discover the canister vent restriction. This may result in premature automatic shut-off events during refueling, and may prevent proper canister purging, thereby increasing vehicle emissions.

In one example, the issues described above may be addressed by a method for a fuel system wherein a fuel vapor canister is vented to an engine intake during a first condition, and wherein a restriction in a canister vent pathway is indicated, responsive to a change in a fuel tank pressure transducer output greater than a threshold. If the fuel tank pressure transducer output changes less than the threshold, degradation of the fuel tank pressure transducer is indicated. In this way, a fuel tank pressure transducer offset may be distinguished from a canister vent pathway restriction if a fuel tank pressure transducer indicates a significant pressure or vacuum in a vented fuel tank.

As one example, the fuel tank may be vented to atmosphere for the duration of a vehicle-off soak. If the fuel tank pressure transducer output is more than a threshold from atmospheric pressure, the canister purge valve is opened. If the FTPT output returns to atmospheric pressure, a canister vent pathway blockage may be inferred. If the FTPT output does not return to atmospheric pressure, FTPT degradation may be inferred. In this way, an on-board test can discern potential reasons for FTPT offset without requiring mechanical intervention.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
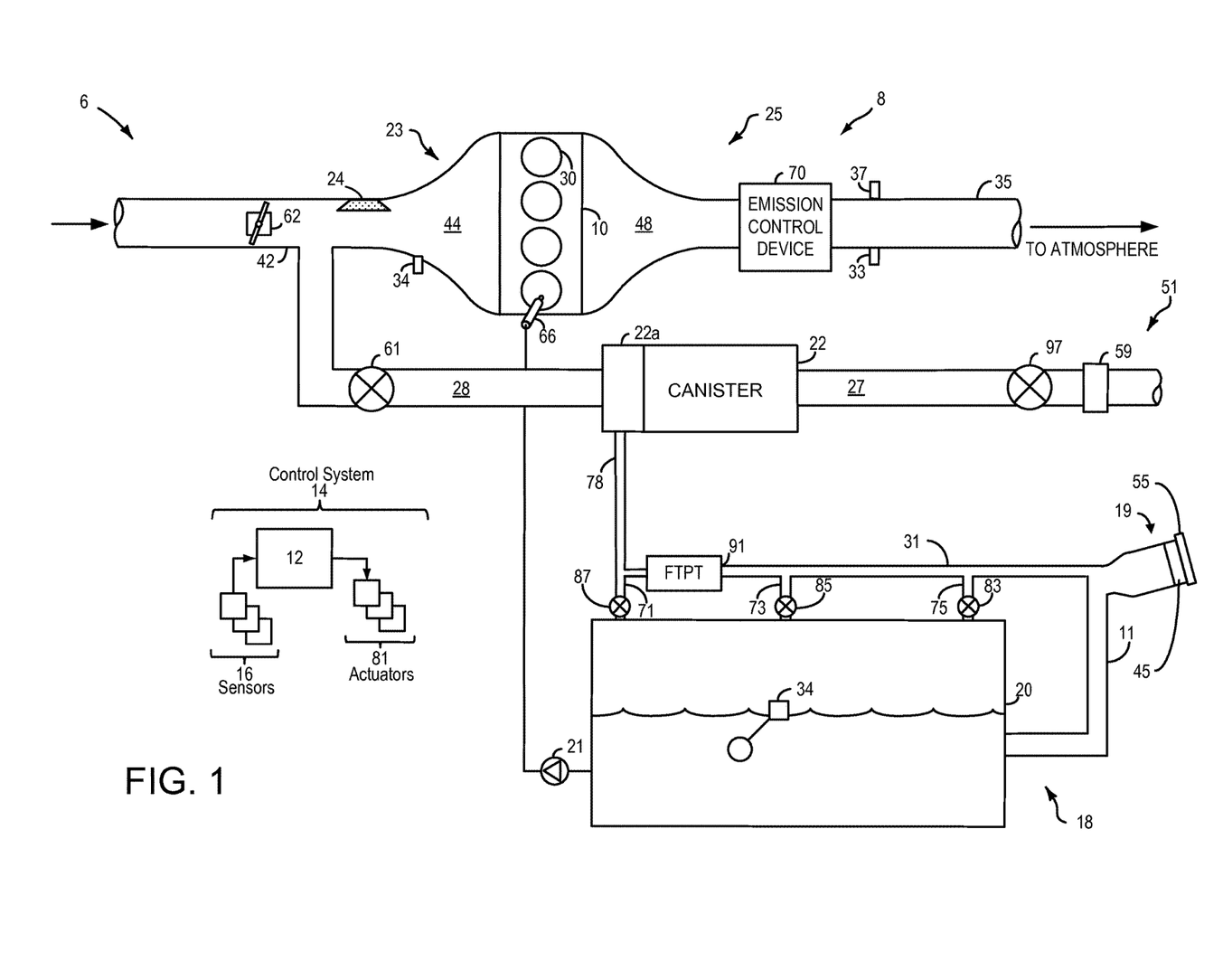
FIG. 1 shows a schematic depiction of a fuel system coupled to an engine system.
Figure 2:
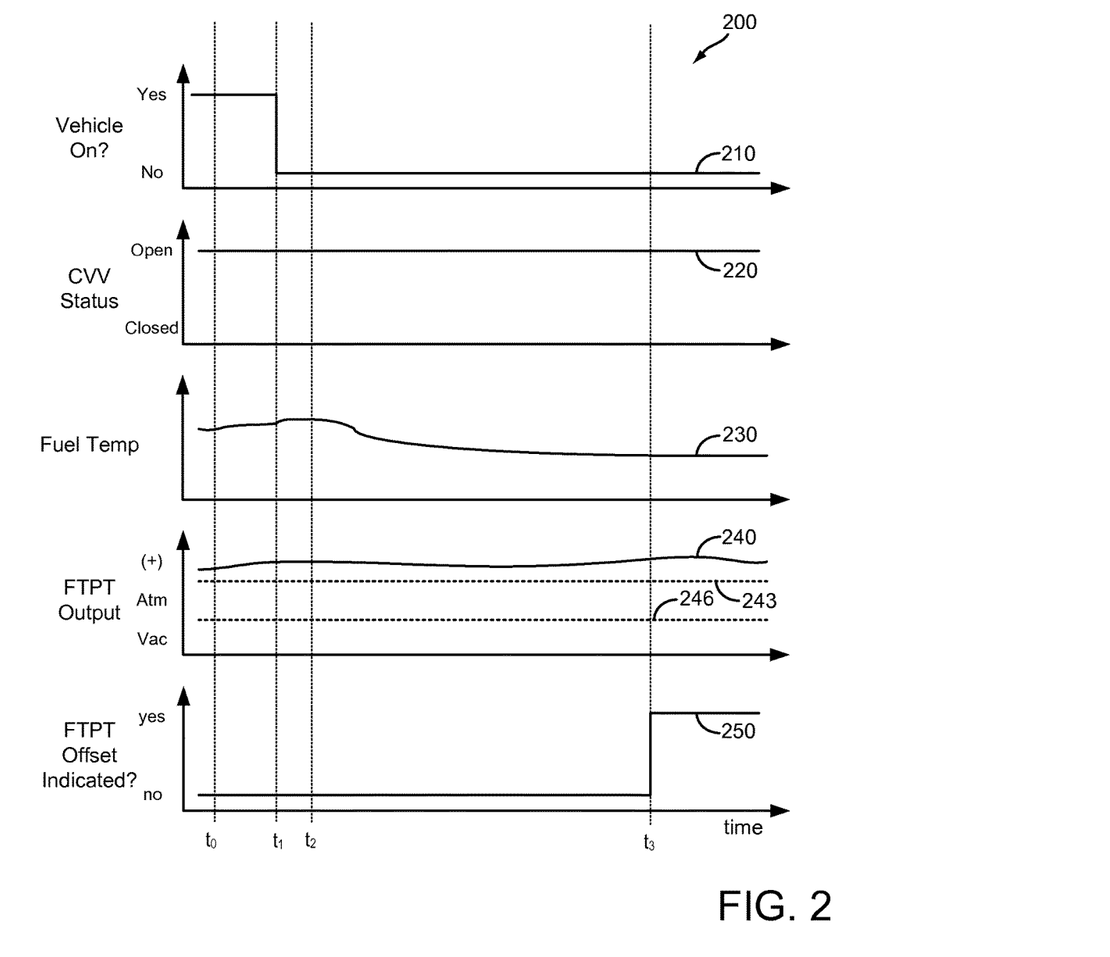
FIG. 2 shows a timeline for an example fuel tank pressure transducer offset test.
Figure 3:
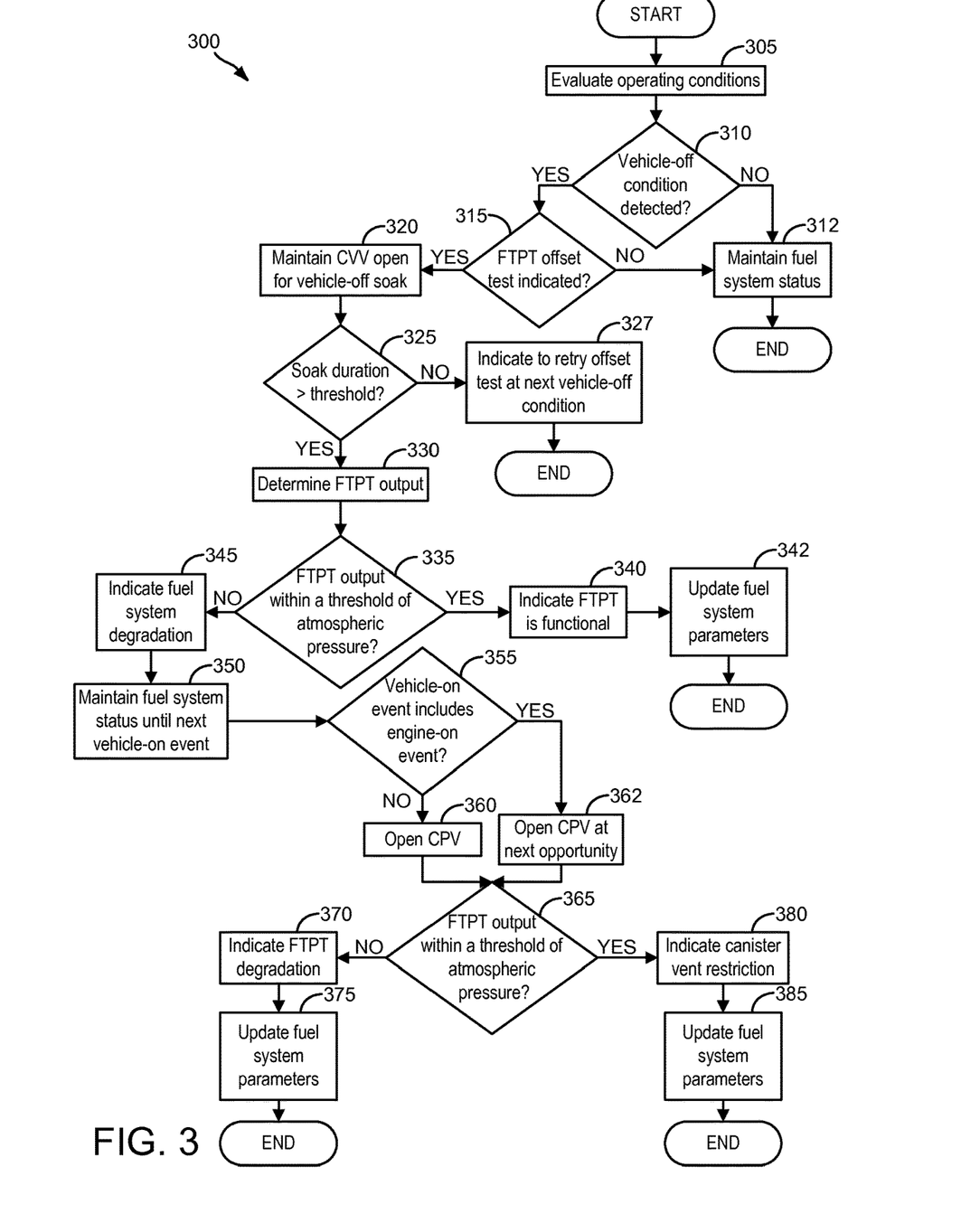
FIG. 3 shows a flow chart for a high-level method for diagnosing fuel system degradation.
Figure 4:
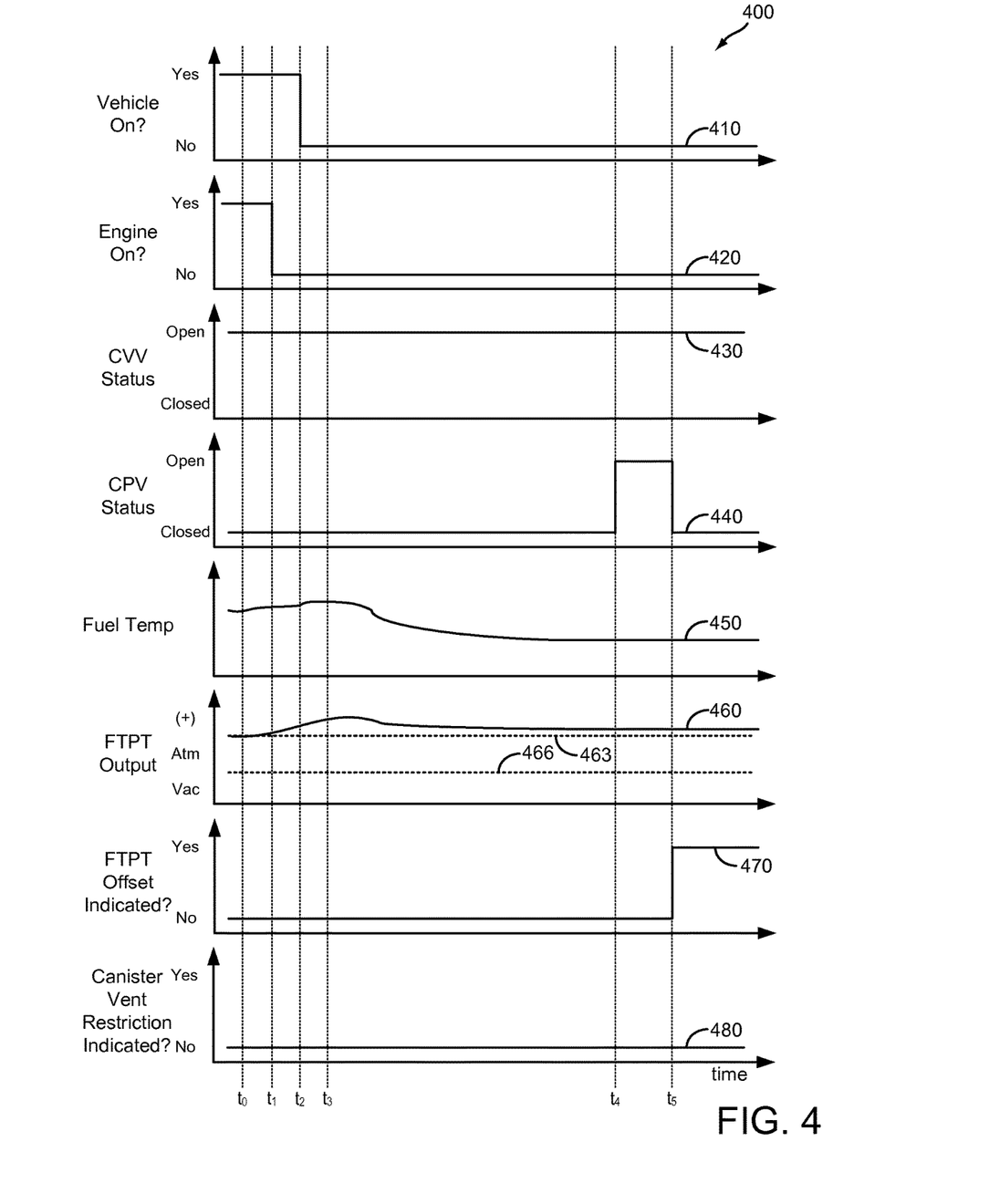
FIG. 4 shows a timeline for an example fuel system degradation test using the method of FIG. 3 applied to a vehicle with a degraded fuel tank pressure transducer.
Figure 5:
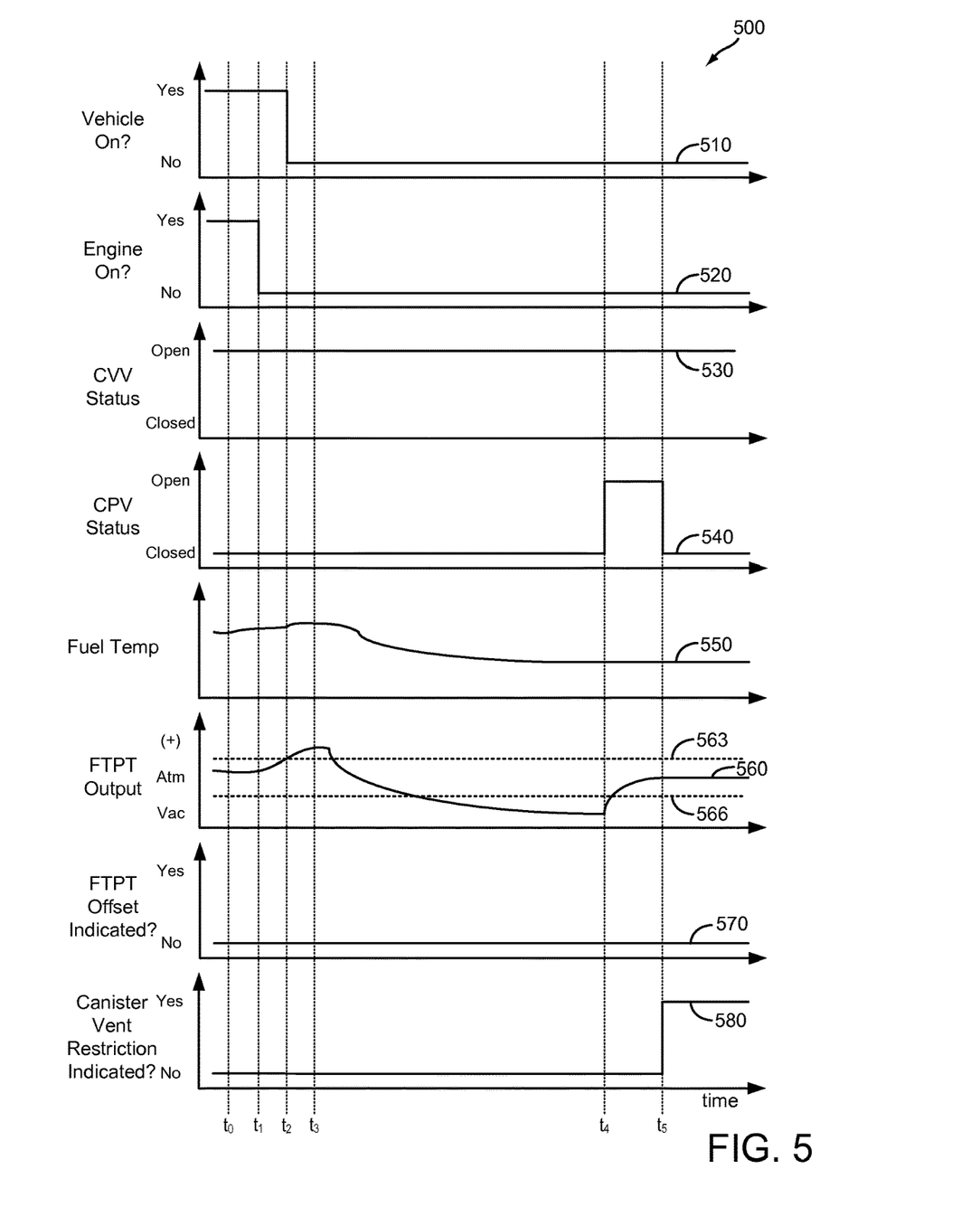
FIG. 5 shows a timeline for an example fuel system degradation test using the method of FIG. 3 applied to a vehicle with a restriction in a canister vent line.

The following description relates to systems and methods for discerning root causes of fuel system degradation. In particular, an initial indication of degradation based on an unexpected fuel tank pressure transducer output is followed by an attempt to equilibrate the fuel tank pressure transducer output by opening a fuel vapor canister purge valve. An engine system may be coupled to a fuel system and an evaporative emissions system as depicted in FIG. 1. Periodically, the fuel system and evaporative emissions system may be tested for leaks. A fuel tank pressure transducer may be used to indicate the integrity of the systems based on expected changes in pressure when the systems are sealed from atmosphere. As such, the fuel tank pressure transducer may be subject to rationality tests. A timeline for a pressure sensor offset test is shown in FIG. 2. If a fuel tank pressure transducer does not output a value within a threshold of atmospheric pressure following a prolonged vehicle soak, the fuel tank pressure transducer may be offset from a baseline value, and may thus be unreliable. However, such a pressure sensor output may also be caused by a canister vent restriction, such as a clogged canister filter, that prevents ventilation of the fuel tank during the prolonged soak. FIG. 3 depicts a method for discerning causes fuel tank pressure transducer offset by opening a canister purge valve in an attempt to return the fuel tank pressure transducer output to atmospheric pressure. If the fuel tank pressure transducer is actually offset, the sensor output will not change, as shown in FIG. 4. If there is a canister vent restriction, the sensor output will return to atmospheric pressure, as shown in FIG. 5.

FIG. 1 shows a schematic depiction of a vehicle system 6. The vehicle system 6 includes an engine system 8 coupled to an emissions control system 51 and a fuel system 18. Fuel system 18 includes a fuel tank pressure transducer 91 which may be used to measure and indicate a vacuum and/or pressure within fuel tank 20 when performing regulatory leak diagnostics. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 24 may be placed in the intake manifold of engine 10 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 24. In addition, fuel vapors stored during an engine shutdown can also be desorbed from the AIS HC during engine operation. In this way, AIS HC 24 may be continually loaded and purged, and the trap may reduce evaporative emissions from the intake passage even when engine 10 is shut down.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51 which includes a fuel vapor canister 22 via vapor recovery line 31 and conduit 78, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75. The vapor recovery line may be configured to hold a percentage of total fuel vapor generated during a refueling event. For example, the vapor recovery line may be configured to hold 20% of the total fuel vapor generated. By effectively increasing the vapor dome volume of the fuel tank, the recovery line may limit the rate of flow of fuel vapor to the fuel vapor canister. Depending on the configuration of the fuel dispenser, a portion of the fuel vapor held within the recovery line may be returned to the fuel dispenser.

Further, in some examples, one or more fuel tank vent valves may be deposed in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system 19 may include a fuel cap 55 for sealing off the fuel filler system from the atmosphere. Fuel filler system 19 is coupled to fuel tank 20 via a fuel filler pipe or neck 11.

Fuel filler system 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 55 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 55. Rather, refueling lock 45 may prevent the insertion of a refueling pump into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 27 may also allow fresh air to be drawn into canister 22 when purging stored fuel vapors from fuel system 18 to engine intake 23 via purge line 28 and canister purge valve 61. For example, canister purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

In some examples, the flow of air and vapors between canister 22 and the atmosphere may be regulated by a canister vent valve (CVV) 97 coupled within vent line 27. CVV 97 may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 97 may be a solenoid valve wherein opening or closing of the valve is performed via actuation of a canister vent solenoid. In particular, the canister vent valve may be an open that is closed upon actuation of the canister vent solenoid. In some examples, CVV 97 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open CVV 97 while closing canister purge valve (CPV) 61 to direct refueling vapors into canister 22 while preventing fuel vapors from being directed into the intake manifold.

As yet another example, the fuel system may be operated in a canister purging mode (e.g., after an emission control device light-off temperature has been attained and with the engine running), wherein the controller 12 may open CPV 61 while maintaining CVV 97 open. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include universal exhaust gas oxygen (UEGO) sensor 37 located upstream of the emission control device, exhaust temperature sensor 33, fuel tank pressure transducer 91, and other sensors depicted in FIG. 1. Other sensors such as pressure, temperature, air/fuel ratio, and composition sensors are not shown, but may be coupled to various locations in the vehicle system 6. As another example, actuators 81 may include canister vent valve 97, canister purge valve 61, and refueling lock 45, as well as other actuators depicted in or described with reference to FIG. 1. The control system 14 may include a controller 12. The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. An example control routine is described herein and with regard to FIG. 3.

Leak detection routines may be intermittently performed by controller 12 on fuel system 18 and emissions control system 51 to confirm that the systems are not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. For example, CPV 61 and CVV 97 may be closed following an engine-off event, sealing the fuel system and evaporative emissions system from atmosphere. In this conformation, a pressure or vacuum will develop within the sealed systems responsive to changes in temperature if the systems are intact. Alternatively, leak detection routines may be performed while the engine is running by operating a vacuum pump and/or using engine intake manifold vacuum. For example, CVV 97 may be closed, and CPV 61 opened while the engine intake manifold vacuum is above a threshold.

When a vacuum is generated within the fuel system, the CPV may be closed, and a rate of vacuum bleed-up analyzed.

Such leak detection routines rely on a functional fuel tank pressure transducer (such as FTPT 91) to measure the pressure or vacuum within the fuel system. As such, the rationality of the FTPT must be periodically tested and confirmed. The FTPT circuit may be periodically tested for an open circuit and/or short circuit. The FTPT may also be tested for offset. If the fuel tank is vented to atmosphere (CVV open), then following a long vehicle soak, the FTPT should output a value within a threshold of atmospheric pressure. A deviation from atmospheric pressure may result in a diagnostic trouble code (DTC) being set at the controller.

FIG. 2 shows a timeline 200 for an example FTPT offset test. Timeline 200 includes plot 210, indicating a vehicle status over time; and plot 220, indicating a canister vent valve status over time. Timeline 200 further includes plot 230, indicating a fuel temperature over time, and plot 240, indicating an output of a fuel tank pressure transducer over time. Lines 243 and 246 represent fuel tank pressure and vacuum thresholds, respectively. Timeline 200 further includes plot 250, indicating whether a FTPT offset malfunction is indicated over time.

At time $t_0$, the vehicle is on, as indicated by plot 210. The vehicle is shut off at time $t_1$. Accordingly, the CVV is maintained open, as indicated by plot 220. Immediately following the vehicle-off event at time $t_1$, the fuel temperature increases, as indicated by plot 230, as heat continues to be rejected to the fuel tank from the vehicle engine and exhaust system. At time $t_2$, the fuel temperature begins to decrease. However, the FTPT output does not decrease accordingly, as shown by plot 240. At time $t_3$, the fuel temperature reaches equilibrium, representing a suitably long vehicle soak. However, the FTPT output is greater than the threshold above than atmospheric pressure represented by line 243. Accordingly, an FTPT offset malfunction is indicated, as shown by plot 250.

In some scenarios, the result of such an FTPT offset test includes the setting of a DTC code for a malfunctioning FTPT. However, a similar FTPT output during such a test may occur due to a restriction in the canister vent pathway between the fuel tank and atmosphere, which may effectively seal the fuel tank from atmosphere, allowing a pressure or vacuum to develop within the fuel tank. In such a scenario, the FTPT may be functioning properly, but a DTC code indicating a malfunction may be set anyways. This may result in the replacement of a functional FTPT by a mechanic, which may be unnecessary and may not address the actual cause of degradation.

FIG. 3 depicts a flow chart for an example method 300 that may be used to discern causes of fuel system and evaporative emissions system degradation. Instructions for carrying out method 300 and other methods included herein may be executed by a controller based on instructions stored in non-transitory memory of the controller, and in conjunction with signals received from sensors of the (engine) system, such as the sensors described above with reference to FIG. 1. The controller may employ (engine) actuators of the (engine) system to adjust (engine) operation, according to the methods described below. While described with reference to the systems depicted in FIG. 1, it should be understood that method 300 or similar methods may be applied to other systems without departing from the scope of this disclosure.

Method 300 begins at 305. At 305, method 300 includes evaluating operating conditions. Operating conditions may be measured, estimated, and/or inferred, and may be based on signals received from one or more sensors, as described with reference to FIG. 1. Among others, operating conditions may include various vehicle conditions, such as vehicle speed, vehicle location, vehicle operation status, etc., various engine conditions, such as engine operating mode, engine speed, engine load, etc., various fuel system conditions, such as fuel level, fuel tank pressure, canister load, etc., and various ambient conditions, such as ambient temperature, barometric pressure, humidity, etc.

Continuing at 310, method 300 includes determining whether a vehicle-off condition has been detected. A vehicle-off condition may include a key-off condition, a remote or near field vehicle-off request, a user setting a vehicle alarm, etc. If no vehicle-off condition is detected, method 300 proceeds to 312, and includes maintaining the status of the fuel system. Method 300 then ends.

If a vehicle-off condition is detected, method 300 proceeds to 315. At 315, method 300 includes determining whether a fuel tank pressure transducer (FTPT) offset test is indicated. An FTPT offset test indication may be stored at a controller, and may be scheduled as a periodic maintenance test, or may be indicated responsive to predetermined operating conditions. An FTPT offset test indication may be conditional based on operating conditions, such as fuel tank fill level. An FTPT offset test indication may be superseded by other testing indications, such as fuel system and/or evaporative emissions leak test indications. If no FTPT offset test is indicated, method 300 proceeds to 312, and includes maintaining the status of the fuel system. Method 300 then ends.

If an FTPT offset test is indicated, method 300 proceeds to 320. At 320, method 300 includes maintaining a canister vent valve open, or otherwise coupling the fuel vapor canister to atmosphere via a canister vent for a vehicle-off soak. In this way, the fuel tank is vented to atmosphere, and a fuel tank pressure transducer measurement may be assumed to equilibrate to atmospheric pressure over time in the absence of degradation.

Continuing at 325, method 300 includes determining whether a vehicle-off soak duration is greater than a threshold. A vehicle-off soak duration may be a predetermined duration, or a duration based on operating conditions. The vehicle-off soak duration may represent a period of time necessary for a fuel tank pressure and temperature to equilibrate to within a threshold of atmospheric conditions. For example, a vehicle-off duration may be six hours. In some examples, the vehicle-off duration may be a based on consecutive measurements (such as fuel tank pressure and/or temperature) being within a threshold of each other. In some examples, the vehicle controller may be placed in a sleep mode and awoken following a predetermined duration, or responsive to consecutive measured parameters. In some scenarios, the controller may be returned to a sleep mode if conditions have not equilibrated. The vehicle-off soak may be interrupted by a vehicle-on condition, a refueling event, significant jostling of the vehicle (e.g., due to closing of a trunk or hood, towing of the vehicle, etc.), significant changes in ambient conditions, or other conditions that cause a change or fluctuation in fuel tank conditions. If the vehicle-off soak duration does not reach the threshold duration method 300 proceeds to 327, and includes indicating to retry the FTPT offset test at a next or subsequent vehicle-off condition.

If the vehicle-off condition is greater than the threshold, method 300 proceeds to 330. At 330, method 300 includes determining or measuring an output of the FTPT. In some examples, such as for vehicles that include a bifurcated or saddle fuel tank, the output of two or more FTPT sensors may be determined. Method 300 may further include determining an ambient barometric pressure, ambient temperature, fuel temperature, and/or other parameters that may influence and/or be related to fuel tank pressure. Continuing at 335, method 300 includes determining whether the output of the FTPT is within a threshold of atmospheric pressure. As an example, the threshold may be 1.5 in H2O above or below atmospheric pressure, but other thresholds may be used based on operating conditions, fuel tank configuration, etc. If the FTPT output is within a threshold of atmospheric pressure, method 300 proceeds to 340. At 340, method 300 includes indicating that the FTPT is functional. Indicating that the FTPT is functional may include recording the passing test at the controller, and may further include updating an FTPT testing schedule, and/or removing a flag set due to a prior failing or indeterminate testing result. Continuing at 342, method 300 may include updating and/or adjusting fuel system parameters based on a functional FTPT. For example, thresholds for future leak tests may be adjusted. Method 300 may then end.

If the FTPT output is not within a threshold of atmospheric pressure, method 300 proceeds to 345. At 345, method 300 includes indicating fuel system degradation. Indicating fuel system degradation may include recording the passing test at the controller, and may further include updating fuel system and/or evaporative emissions testing schedules. In some examples, indicating fuel system degradation may not include indicating degradation of the FTPT. Continuing at 350, method 300 may include maintaining the fuel system status until the next vehicle-on event. Maintaining the fuel system status may include maintaining the CVV open. The vehicle controller may be placed in an asleep mode until the next vehicle-on event.

Continuing at 355, method 300 includes determining whether the vehicle-on event includes an engine-on event. For hybrid-electric vehicles, engine combustion may not be initiated at the initial vehicle-on event. Rather, the vehicle may be run in an electric-only mode until the engine is needed to meet a desired output torque, for example. If the vehicle-on event does not include an engine-on event, method 300 proceeds to 360. At 360, method 300 includes opening the CPV. In this way, the fuel tank may be vented to the engine intake, thereby enabling the controller to discern whether the FTPT output was offset due to degradation of the FTPT, or due to a restriction in the canister vent pathway (e.g., fuel tank was actually at atmospheric pressure, or fuel tank was actually a threshold away from atmospheric pressure. However, this configuration may also cause fuel vapor to be drawn from the fuel tank and fuel vapor canister into the engine intake manifold. As such, if the vehicle-on event includes an engine-on event, method 300 proceeds to 362, and includes opening the CPV at the next opportunity. For example, the next opportunity may be at a subsequent vehicle-off condition or an idle stop. In some examples, the controller may prevent the opening of the CPV based on an expected engine-on event within a duration of the vehicle-on event. If the engine is turned on while the CPV is open, the CPV may be closed, and the controller may indicate to retry the FTPT offset test at the next vehicle-off condition.

Following opening the CPV in the absence of engine combustion, method 300 proceeds to 365. At 365, method 300 includes determining whether the FTPT output is within a threshold of atmospheric pressure. The threshold may be predetermined or based on current conditions, and may be the same threshold as the threshold described with reference to 335, or may have a smaller absolute pressure value than the previous threshold. In some examples the FTPT output may be observed from the time of CPV opening, and a rate of change compared to a threshold. If the FTPT output is not within the threshold of atmospheric pressure, method 300 proceeds to 370, and includes indicating FTPT degradation. Indicating FTPT degradation may include recording the failing test result at the controller, and may further include illuminating a malfunction indicator lamp (MIL) or otherwise communicating the failing test result to the vehicle operator. Continuing at 375, method 300 includes updating fuel system operating parameters based on the indicated FTPT degradation. For example, additional FTPT rationality tests may be scheduled, leak tests may be postponed or adjusted based on the FTPT offset, etc. Method 300 may then end.

If the FTPT output is within the threshold of atmospheric pressure, method 300 proceeds to 380, and includes indicating a canister vent restriction. Indicating a canister vent restriction may include recording the failing test result at the controller, and may further include illuminating a malfunction indicator lamp (MIL) or otherwise communicating the failing test result to the vehicle operator. Continuing at 385, method 300 includes updating fuel system operating parameters. For example, additional canister vent integrity tests may be scheduled, canister purging schedules may be adjusted, refueling strategies may be adjusted, etc. Method 300 may then end.

FIG. 4 shows a timeline 400 for an example FTPT offset test using the method described herein and with regard to FIG. 3 as applied to a vehicle with degraded fuel tank pressure transducer. Timeline 400 includes plot 410, indicating a vehicle status over time; as well as plot 420, indicating an engine status over time. Timeline 400 further includes plot 430, indicating a canister vent valve status over time; and plot 440, indicating a canister purge valve status over time. Timeline 400 further includes plot 450, indicating a fuel temperature over time, and plot 460, indicating an output of a fuel tank pressure transducer over time. Lines 463 and 466 represent fuel tank pressure and vacuum thresholds, respectively. Timeline 400 further includes plot 470, indicating whether a FTPT offset malfunction is indicated over time; and plot 480, indicating whether a canister vent restriction is indicated over time.

At time $t_0$, the vehicle is on, as indicated by plot 410, and the vehicle engine is on, as indicated by plot 420. Accordingly, the CVV is open, as indicated by plot 430, and the CPV is closed, as indicated by plot 440. At time $t_1$, the vehicle engine is turned off, followed by the vehicle being turned off at time $t_2$. In order to execute a FTPT offset test, the CVV is maintained open, while the CPV is maintained closed during the vehicle off condition.

Immediately following the engine-off and vehicle-off events, the fuel temperature continues to increase, as indicated by plot 450, as residual engine and exhaust heat is rejected to the fuel tank. Similarly, the FTPT output increases, as shown by plot 460. At time $t_3$, the fuel temperature and FTPT output begin to decrease. At time $t_4$, the fuel temperature reaches a plateau, indicating a vehicle-off soak of sufficient duration to ascertain whether the FTPT output has equilibrated to atmospheric pressure. However, at time $t_4$, the FTPT output remains above atmospheric pressure by more than the threshold represented by line 463.

However, neither FTPT degradation nor canister vent blockage is indicated, as shown by plots 470 and 480, respectively. Rather, the CPV is opened, coupling the fuel vapor canister and fuel tank to the engine intake. The CPV is maintained open from time $t_4$ to time $t_5$. However, the FTPT does not decrease, ruling out a canister vent blockage as a cause of the FTPT offset. Accordingly, at time $t_5$, FTPT degradation in the form of an FTPT offset is indicated.

FIG. 5 shows a timeline 500 for an example FTPT offset test using the method described herein and with regard to FIG. 3 as applied to a vehicle with a canister vent restriction. Timeline 500 includes plot 510, indicating a vehicle status over time; as well as plot 520, indicating an engine status over time. Timeline 500 further includes plot 530, indicating a canister vent valve status over time; and plot 540, indicating a canister purge valve status over time. Timeline 500 further includes plot 550, indicating a fuel temperature over time, and plot 560, indicating an output of a fuel tank pressure transducer over time. Lines 563 and 566 represent fuel tank pressure and vacuum thresholds, respectively. Timeline 500 further includes plot 570, indicating whether a FTPT offset malfunction is indicated over time; and plot 580, indicating whether a canister vent restriction is indicated over time.

Conditions and events for timeline 500 are similar to those for timeline 400 from time $t_0$ to time $t_3$. The engine and vehicle are sequentially turned off, while the CVV is maintained open and the CPV is maintained closed. At time $t_3$, the fuel temperature begins to decrease, as indicated by plot 550. The FTPT output also decreases, as indicated by plot 560, suggesting a vacuum is being generated within the fuel tank. At time $t_4$, the fuel temperature reaches a plateau, indicating a vehicle-off soak of sufficient duration to ascertain whether the FTPT output has equilibrated to atmospheric pressure. At time $t_4$, the FTPT output has decreased below atmospheric pressure by more than the threshold represented by line 566. However, neither FTPT degradation nor canister vent blockage is indicated, as shown by plots 570 and 580, respectively. Rather, the CPV is opened, coupling the fuel vapor canister and fuel tank to the engine intake. The CPV is maintained open from time $t_4$ to time $t_5$. The FTPT output returns to atmospheric pressure at time $t_5$, indicating that the offset in FTPT output at time $t_4$ was relieved, and that the FTPT is functional. Accordingly, a canister vent blockage is indicated.

The systems described herein and with reference to FIG. 1, along with the methods described herein and with reference to FIG. 3 may enable one or more systems and one or more methods. In one example, a method for a fuel system is provided, comprising: during a first condition, venting a fuel vapor canister to an engine intake; and indicating a restriction in a canister vent pathway responsive to a change in a fuel tank pressure transducer output greater than a threshold. In this example, or any other example, the method may additionally or alternatively comprise updating one or more fuel system parameters responsive to an indication of a restriction in the canister vent pathway. In this example, or any other example wherein one or more fuel system parameters are updated responsive to an indication of a restriction in the canister vent pathway, the one or more fuel system parameters may additionally or alternatively comprise a fuel canister purge schedule. In this example, or any other example, the method may additionally or alternatively comprise indicating degradation of a fuel tank pressure transducer responsive to a change in a fuel tank pressure transducer output less than a threshold. In this example, or any other example wherein degradation of a fuel tank pressure transducer is indicated responsive to a change in a fuel tank pressure transducer output less than a threshold, the method may additionally or alternatively comprise updating one or more fuel system parameters responsive to an indication of degradation of a fuel tank pressure transducer. In this example, or any other example wherein degradation of a fuel tank pressure transducer is indicated responsive to a change in a fuel tank pressure transducer output less than a threshold, the first condition may additionally or alternatively comprise a fuel tank pressure transducer output more than a threshold different from atmospheric pressure. In this example, or any other example wherein the first condition comprises a fuel tank pressure transducer output more than a threshold different from atmospheric pressure, the first condition may additionally or alternatively follow a vehicle-off soak comprising a duration greater than a threshold. In this example, or any other example wherein the first condition follows a vehicle-off soak, the vehicle-off soak may additionally or alternatively comprise a canister vent valve in an open conformation and a canister purge valve in a closed conformation. In this example, or any other example wherein the first condition follows a vehicle-off soak, the first condition may additionally or alternatively comprise a vehicle-on, engine-off condition. In this example, or any other example wherein the first condition follows a vehicle-off soak the first condition may additionally or alternatively follow a first vehicle-on event following the vehicle-off soak. The technical effect of implementing this method is a decrease in vehicle warranty costs. By discerning true FTPT offset from offset due to canister vent restrictions, the root of a fuel system test failure may be diagnosed on-board, thus preventing misdiagnosis and unnecessary repairs at the mechanic.

In another example, a method for a fuel system is provided, comprising: responsive to a vehicle-off condition, maintaining a canister vent valve open and a canister purge valve closed for a vehicle-off soak; following the vehicle-off soak, opening the canister purge valve responsive to a fuel tank pressure transducer output more than a threshold different from atmospheric pressure; and indicating fuel tank pressure transducer degradation responsive to the fuel tank pressure transducer output failing to equilibrate to within a threshold of atmospheric pressure. In this example, or any other example, the method may additionally or alternatively comprise updating one or more fuel system parameters responsive to the indication of fuel tank pressure transducer degradation. In this example, or any other example, the method may additionally or alternatively comprise indicating a canister vent pathway restriction responsive to the fuel tank pressure transducer output equilibrating to within a threshold of atmospheric pressure. In this example, or any other example, the method may additionally or alternatively comprise opening the canister purge valve during a vehicle-on, engine-off condition following the vehicle-off soak. In this example, or any other example, the method may additionally or alternatively comprise indicating to execute a fuel tank pressure transducer offset test at a subsequent vehicle-off condition responsive to the vehicle-off soak having a duration less than a threshold. In this example, or any other example, the method may additionally or alternatively comprise following the vehicle-off soak, indicating that fuel tank pressure transducer integrity responsive to a fuel tank pressure transducer output within a threshold of atmospheric pressure. The technical result of implementing this method is a reduction in vehicle bleed emissions. By diagnosing FTPT offset, the fuel system leak detection systems may be performed with increased accuracy. Further, by diagnosing canister vent restrictions, fuel system parameters may be adjusted to compensate for the restriction until the restriction can be removed.

In yet another example, a fuel system for a vehicle is presented, comprising: a fuel tank coupled to a fuel vapor canister; a fuel tank pressure transducer coupled to the fuel tank; an engine intake coupled to the fuel vapor canister via a canister purge valve; a canister vent pathway coupling the fuel vapor canister to atmosphere via a canister vent valve; and a controller configured with instructions stored in non-transitory memory, that when executed, cause the controller to: responsive to a vehicle-off condition, maintain the canister vent valve open and the canister purge valve closed for a vehicle-off soak; following the vehicle-off soak, open the canister purge valve responsive to a fuel tank pressure transducer output more than a threshold different from atmospheric pressure; and indicate degradation of the fuel tank pressure transducer responsive to the fuel tank pressure transducer output failing to equilibrate to within a threshold of atmospheric pressure. In this example, or any other example the controller may additionally or alternatively be configured with instructions stored in non-transitory memory, that when executed, cause the controller to: indicate a canister vent pathway restriction responsive to the fuel tank pressure transducer output equilibrating to within a threshold of atmospheric pressure. In this example, or any other example the controller may additionally or alternatively be configured with instructions stored in non-transitory memory, that when executed, cause the controller to: following the vehicle-off soak, indicate that the fuel tank pressure transducer is intact responsive to a fuel tank pressure transducer output within a threshold of atmospheric pressure. In this example, or any other example the controller may additionally or alternatively be configured with instructions stored in non-transitory memory, that when executed, cause the controller to: indicate to execute a fuel tank pressure transducer offset test at a subsequent vehicle-off condition responsive to the vehicle-off soak having a duration less than a threshold. The technical result of implementing this system is a reduction in false-failures in testing for FTPT offset. By opening the CPV responsive to an offset FTPT output value, any potential pressure or vacuum may be vented to atmosphere. In this way, offset FTPT output values due to canister vent restrictions may be attributed to the actual cause.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
determining that output of a fuel tank pressure transducer (FTPT) differs from atmospheric pressure by at least a threshold amount during a vehicle-off condition;
upon a subsequent vehicle-on condition, venting a fuel vapor canister to an engine intake; and
upon the venting, indicating a restriction in a canister vent pathway responsive to a change in the output of the FTPT being greater than a threshold change.

2. The method of claim 1, further comprising:
updating one or more fuel system parameters responsive to the indication of the restriction in the canister vent pathway.

3. The method of claim 2, wherein the one or more fuel system parameters include a fuel canister purge schedule.

4. The method of claim 1, further comprising:
indicating degradation of the FTPT responsive to a change in the output of the FTPT less than the threshold change.

5. The method of claim 4, further comprising:
updating one or more fuel system parameters responsive to the indication of degradation of the FTPT.

6. The method of claim 1, wherein the venting follows a vehicle-off soak comprising a duration greater than a threshold.

7. The method of claim 6, wherein the vehicle-off soak further comprises a canister vent valve in an open conformation and a canister purge valve in a closed conformation.

8. The method of claim 6, wherein the venting is performed responsive to a vehicle-on, engine-off condition.

9. The method of claim 6, wherein the venting follows a first vehicle-on event following the vehicle-off soak.

10. A method for a fuel system, comprising:
maintaining a canister vent valve open and a canister purge valve closed for a vehicle-off soak following a vehicle-off condition;
following the vehicle-off soak, determining that a fuel tank pressure transducer output is more than a threshold different from atmospheric pressure and in response, opening the canister purge valve; and upon opening the canister purge valve, determining that the fuel tank pressure transducer output fails to equilibrate to within a threshold of atmospheric pressure and in response, indicating fuel tank pressure transducer degradation.

11. The method of claim 10, further comprising:

updating one or more fuel system parameters responsive to the indication of fuel tank pressure transducer degradation.

12. The method of claim 10, further comprising:

upon opening the canister purge valve, determining that the fuel tank pressure transducer output equilibrates to within a threshold of atmospheric pressure and in response, indicating a canister vent pathway restriction.

13. The method of claim 10, wherein the canister purge valve is opened during a vehicle-on, engine-off condition following the vehicle-off soak.

14. The method of claim 10, further comprising:

indicating to execute a fuel tank pressure transducer offset test at a subsequent vehicle-off condition responsive to the vehicle-off soak having a duration less than a threshold.

15. The method of claim 10, further comprising:

following the vehicle-off soak, determining that a fuel tank pressure transducer output is within a threshold of atmospheric pressure and in response, indicating that a fuel tank pressure transducer is functional.

16. A fuel system for a vehicle, comprising:

a fuel tank coupled to a fuel vapor canister;

a fuel tank pressure transducer coupled to the fuel tank;

an engine intake coupled to the fuel vapor canister via a canister purge valve;

a canister vent pathway coupling the fuel vapor canister to atmosphere via a canister vent valve; and a controller configured with instructions stored in non-transitory memory, that when executed, cause the controller to:

responsive to a determination of a vehicle-off condition, maintain the canister vent valve open and the canister purge valve closed for a vehicle-off soak;

following the vehicle-off soak, open the canister purge valve responsive to a fuel tank pressure transducer output more than a threshold different from atmospheric pressure; and indicate degradation of the fuel tank pressure transducer responsive to a determination that the fuel tank pressure transducer output fails to equilibrate to within a threshold of atmospheric pressure.

17. The fuel system of claim 16, wherein the controller is further configured with instructions stored in non-transitory memory, that when executed, cause the controller to:

indicate a canister vent pathway restriction responsive to the fuel tank pressure transducer output equilibrating to within a threshold of atmospheric pressure.

18. The fuel system of claim 17, wherein the controller is further configured with instructions stored in non-transitory memory, that when executed, cause the controller to:

following the vehicle-off soak, indicate that the fuel tank pressure transducer is intact responsive to a fuel tank pressure transducer output within a threshold of atmospheric pressure.

19. The fuel system of claim 18, wherein the controller is further configured with instructions stored in non-transitory memory, that when executed, cause the controller to:

indicate to execute a fuel tank pressure transducer offset test at a subsequent vehicle-off condition responsive to the vehicle-off soak having a duration less than a threshold.

* * * * *